United States Patent
Westrich

[11] Patent Number: 6,007,091
[45] Date of Patent: *Dec. 28, 1999

[54] SAFETY CUSHION ASSEMBLY, SPECIFICALLY IN A SEATING ELEMENT FOR AN AUTOMOTIVE VEHICLE

[75] Inventor: Andreas Westrich, Schwedelbach, Germany

[73] Assignee: Lear Corporation, Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/974,767

[22] Filed: Nov. 20, 1997

[51] Int. Cl.$^6$ ................................................ B60R 21/22
[52] U.S. Cl. ................................ 280/730.2; 280/728.3
[58] Field of Search ........................... 280/730.2, 728.3, 280/730.1, 728.2, 743.1

[56] References Cited

U.S. PATENT DOCUMENTS

| | | | |
|---|---|---|---|
| 5,240,283 | 8/1993 | Kishi et al. | 280/729 |
| 5,678,853 | 10/1997 | Maly | 280/730.2 |
| 5,749,597 | 5/1998 | Saderholm | 280/728.2 |
| 5,762,363 | 6/1998 | Brown et al. | 280/730.2 |
| 5,803,490 | 9/1998 | Seventko et al. | 280/730.2 |
| 5,863,063 | 1/1999 | Harrell | 280/730.2 |
| 5,882,033 | 3/1999 | Lachat | 280/728.3 |
| 5,893,579 | 4/1999 | Kimura et al. | 280/730.2 |
| 5,899,489 | 5/1999 | Jost | 280/730.2 |
| 5,927,749 | 7/1999 | Homier et al. | . |

FOREIGN PATENT DOCUMENTS 08258660  10/1996  Japan .

Primary Examiner—Daniel G. DePumpo
Assistant Examiner—David R. Dunn
Attorney, Agent, or Firm—Brooks & Kushman P.C.

[57] ABSTRACT

The invention relates to an automotive vehicle element that is capable of receiving a safety cushion and that has an envelope equipped with a seam that can be ripped as the result of the effect of the cushion's inflation. According to the invention, it includes a pocket that is constructed so as to receive the cushion, the pocket having an opening whose edges are attached to the lips of the rippable seam.

10 Claims, 2 Drawing Sheets

SAFETY CUSHION ASSEMBLY, SPECIFICALLY IN A SEATING ELEMENT FOR AN AUTOMOTIVE VEHICLE

TECHNICAL FIELD

The present invention relates to a safety cushion assembly for an automotive vehicle.

BACKGROUND ART

Safety cushions for automotive vehicles are known. In the event of an impact, as detected by an accelerometer, these cushions emerge from their casing, in which they are stored in folded form, are suddenly inflated, and thus protect the passengers by interposing themselves between the passengers and any potentially hazardous structural elements of the vehicle.

The best known safety cushions, i.e. air bags, are the ones that are located in front of the front seat passengers, for example, in the steering wheel or in the dashboard. They protect the front seat passengers in the event of a frontal impact. However, safety cushions also exist whose purpose is to protect the passengers in the event of a side impact.

Specifically, these safety cushions can be encased in the vehicle seats and, yet more specifically, in the backs of the seats. In this case, a seam is provided in the seat envelope, with the strength of the seam being such that the seam can be rippled, or burst, as a result of the effect of the inflation of the cushion.

Furthermore, the seating elements of automotive vehicles are being manufactured more frequently through the use of the so-called "in situ" molding method. In this method, a filling or packing foam is injected directly into a mold whose inner wall is covered by the envelope of the seating element, which is usually a textile fabric. Thus, the element is produced immediately upon opening the mold, along with the foam that fills the envelope.

Unfortunately, it has been observed that the in situ molding method per se cannot be used to mold the safety elements that contain a safety cushion. In fact when the safety cushion inflates, an actual explosion occurs which not only causes the bursting of the seam provided for this purpose, but also ejects pieces of foam through the resulting aperture. Although these pieces of foam are light in weight, the speed is such that they can cause serious injury to the occupants of the vehicle, specifically to the eyes.

SUMMARY OF THE INVENTION

The purpose of the present invention is to remedy these disadvantages and, more specifically, to provide a method for mounting a safety cushion in an automotive vehicle seating element molded in situ.

Accordingly, the invention relates to an automotive vehicle element that is capable of receiving a safety cushion and that has an envelope equipped with a seam that can be ripped as a result of the effect of the cushion's inflation, characterized by the fact that it includes a pocket that is constructed so as to receive the cushion, with the pocket having an opening whose edges are connected to the lips of the rippable seam.

Thus, the cushion is not in contact with the foam. When the cushion inflates, it bursts the edges of the pocket's opening that contains it, thereby causing the lips of the rippable seam to separate and the seam itself to burst.

It should be noted here that when the edges of the pocket's opening are described as being attached to the lips of the rippable seam, it should be understood that this attachment may be realized with any appropriate means, and therefore not only by means of a seam, but also through welding, gluing, or any other method.

In one specific embodiment, the lips form two edges that are turned back toward the interior of the element, with the edges of the pocket's opening being attached to the lips.

More specifically, the edges of the pocket's opening may be turned back and attached, on their back sides, to the lips.

The pocket's opening and the seam may extend longitudinally beyond the casing of the safety cushion.

In fact, the dimensions of the safety cushion casings are relatively small. The type of construction described above allows the cushion, when inflated, to be extended over the entire desired length, depending on the degree of protection required for the passengers.

The pocket may be made of non-woven sheets. In fact, the pocket may be made of a material that is less expensive than the envelope, inasmuch as the pocket is located inside the envelope and the foam that fills it. It should also be noted that the two sides of the seam may be made of different materials, for aesthetic or other reasons.

In one specific embodiment, the element according to the invention includes an attached part or element that closes the recess in which the pocket is located and to which the safety cushion is attached.

Thus, the in situ molding can be realized without the safety cushion, and the safety cushion can be installed later.

BRIEF DESCRIPTION OF THE DRAWINGS

As a non-limitative example, one specific embodiment of the invention will now be described, with reference to the attached diagrammatic drawings, of which.

BEST MODE FOR CARRYING OUT THE INVENTION

Figure 1:
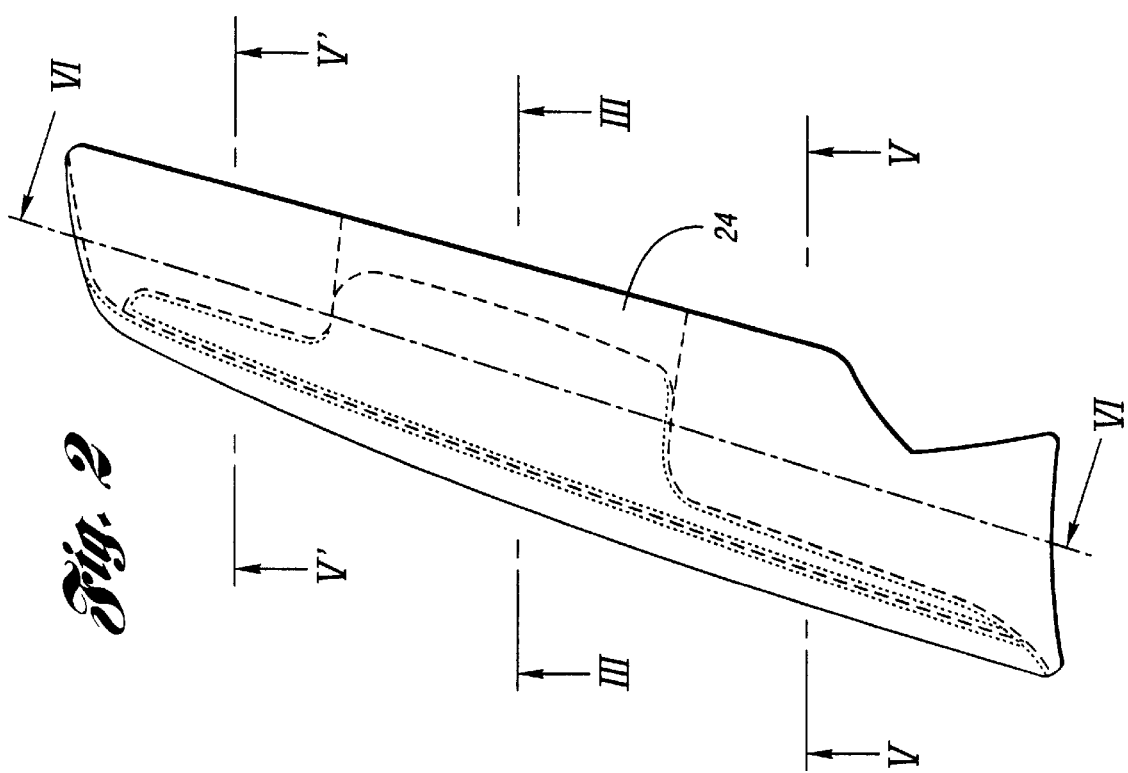
FIG. 1 is a horizontal cross-sectional diagram illustrating the principle of the invention.
Figure 2:
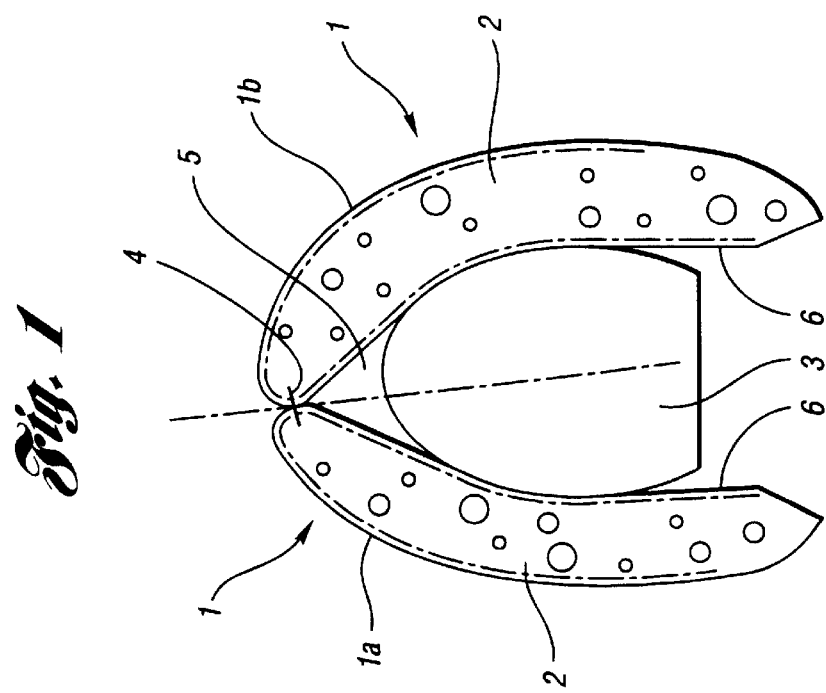
FIG. 2 is a side view of an automotive vehicle seat back manufactured according to the invention.

FIG. 1 shows an automotive vehicle element realized in accordance with the invention, i.e. a seat frame that has an outer envelope 1. This envelope is filled with a foam 2, which in this example is molded in situ in the envelope 1. This assembly contains an inflatable safety cushion 3, and in fact constitutes a module containing this cushion in association with its impact-detection and inflation equipment.

In this example, the envelope 1 consists of two parts 1a and 1b, which are joined by a seam 4, which seam is designed so as to break as the result of the inflation of the cushion 3, which inflation in turn occurs when an impact is applied to the vehicle from a given direction, i.e. laterally.

In accordance with the invention, the cushion 3 is contained in a pocket 5 whose wall 6, which consists, for example, of sheets of non-woven fabric, is attached to the envelope 1 in proximity to the seam 4, in a manner that will be described with reference to FIGS. 2 through 6. The envelope 1 and the wall 6 of the pocket 5 are open at the back (as shown at the bottom of FIG. 1), in order to allow the inflatable cushion 3 to be installed.

Thus, it can be seen that the foam 2 occupies only the limited volumetric area located between the envelope 1 and the wall 6. When the cushion inflates, it causes the seam 4 to burst, but the foam 2 remains confined within this limited volumetric area, and therefore cannot be propelled into the passenger compartment of the vehicle.

FIGS. 2 through 6 repeat the references shown in FIG. 1, with the addition of the tens-figure "1".

Figure 3:
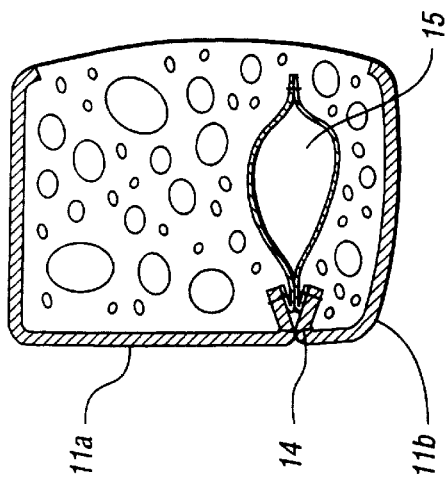
FIG. 3 is a cross-sectional view along line III—III in FIG. 2.
Figure 4:
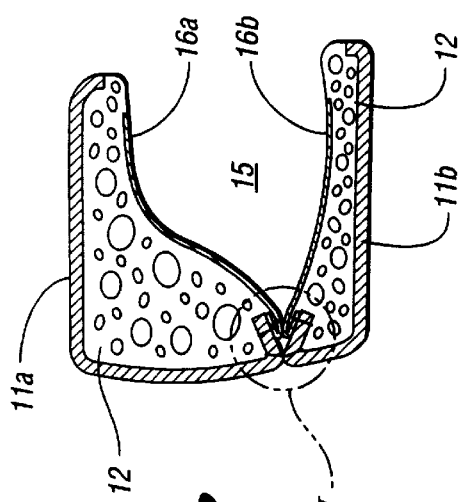
FIG. 4 is a larger-scale view of detail IV in FIG. 3.

In FIGS. 3 and 4 it can be seen that the edges of the two parts 11a and 11b of the envelope, beyond the seam 14, are turned back toward the interior of the element, where they form two lips 20a and 20b.

The wall 16 of the pocket 15, which consists of two parts 16a and 16b, has an opening 21, each of whose edges 22a and 22b is turned back toward the outside of the pocket to form a hem. The pocket 15 is attached to the envelope by two seams 23a and 23b, which join the lips 20a and 20b to the edges 22a and 22b. Thus, the elements 16a and 16b of the wall of the pocket 15 are located in the extension of the elements 11a and 11b of the envelope, respectively. Thus, when the seam 14 bursts, the inside of the pocket is placed in communication with the passenger compartment of the vehicle, and the foam 12 remains confined between the envelope and the wall of the pocket.

Figure 5:
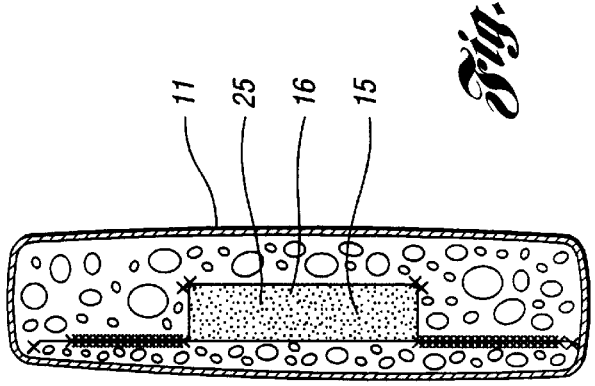
FIG. 5 is a cross-sectional view along either line V—V or V'—V' in FIG. 2.
Figure 6:
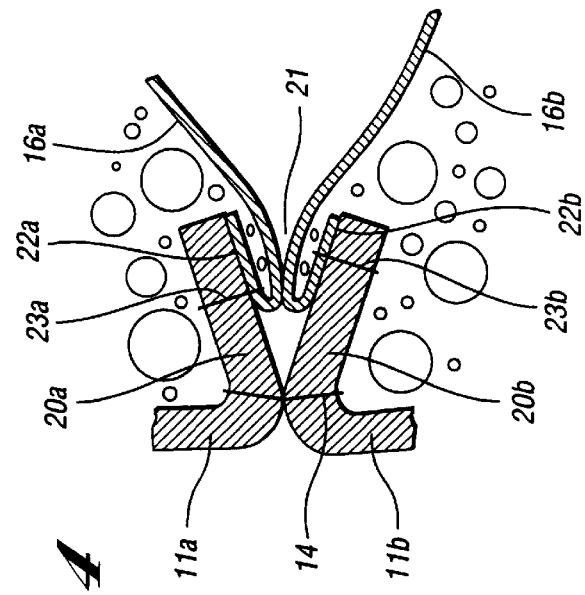
FIG. 6 is a cross-sectional view along line VI—VI in FIG. 2.

In FIGS. 3 and 5, it can be seen that the pocket 15 which, in order to allow the cushion to be installed, is extended upward and downward, is open toward the back in the region 25 in which the safety cushion is encased, in the same way as the seam 14. However, in these upper and lower regions, the elements 16a and 16b of the pocket are sewn together at the back, and the foam 2 also extends to the back of the pocket.

The opening 24 in the region 25 in which the safety cushion is housed is closed by a suitable element (not shown). This element may also be used as a support for the cushion, with the cushion and the closure of the opening being assembled in a single operation.

While the best mode for carrying out the invention has been described in detail, those familiar with the art to which this invention relates will recognize various alternative designs and embodiments for practicing the invention as defined by the following claims.

What is claimed is:

1. An automotive vehicle element capable of receiving an inflatable safety cushion, the element comprising:

an envelope having an interior surface, first and second edges that are turned back toward said interior surface to form first and second lips, respectively, each of said lips having a lip surface, said lip surfaces cooperating to define a potential envelope opening, said envelope further having a seam joining said lip surfaces together and having a breakable portion that can be broken as a result of the cushion's inflation; and a pocket that is constructed so as to receive the cushion, said pocket having an exterior surface, an opening proximate said seam, and first and second wall portions formed separately from said envelope, said first wall portion having a first end that is turned back toward said exterior surface of said pocket to form a first fold, said first fold being attached to said first lip and said second wall portion being attached to said second lip whereby said first fold engages said lip surface of said first lip.

2. The vehicle element in accordance with claim 1 in which said pocket has a region in which the safety cushion is housed, and said pocket opening and said seam extend longitudinally beyond said region.

3. The vehicle element in accordance with claim 1 in which said wall portions of said pocket comprise non-woven sheets.

4. The vehicle element of claim 1 wherein said envelope is formed of a first material, and said pocket is formed of a second material different than said first material.

5. The vehicle element of claim 1 wherein said second wall portion has a first end that is turned back toward said exterior surface of said pocket to form a second fold, said second fold being attached to said second lip whereby said second fold engages said lip surface of said second lip.

6. An automotive vehicle element capable of receiving an inflatable safety cushion, the element comprising:

an envelope having an interior surface and first and second parts, each of said parts having first and second edges, said first edges of said first and second parts being turned back toward said interior surface to form first and second lips, respectively, each of said lips having a lip surface, said lip surfaces cooperating to define a potential envelope opening, said envelope further having a first seam joining said lip surfaces together and having a breakable portion that can be broken as a result of inflation of the safety cushion; and a pocket for receiving the safety cushion, said pocket having an exterior surface and first and second wall portions that define an opening proximate said seam, each of said wall portions having first and second ends, said first ends of said first and second wall portions being turned back toward said exterior surface to form first and second folds, respectively, said first and second folds being joined to said first and second lips, respectively whereby said first and second folds engage said first and second lip surfaces, respectively.

7. The vehicle element in accordance with claim 6 in which said pocket has a region in which the safety cushion is housed, and said pocket opening and said seam extend longitudinally beyond said region.

8. The vehicle element in accordance with claim 8 in which said wall portions of said pocket comprise non-woven sheets.

9. The vehicle element of claim 6 wherein said envelope is formed of a first material, and said pocket is formed of a second material different than said first material.

10. The vehicle element in accordance with claim 5 further comprising second and third seams for respectively attaching said first and second folds to said first and second lips.

* * * * *

UNITED STATES PATENT AND TRADEMARK OFFICE
CERTIFICATE OF CORRECTION

PATENT NO : 6,007,091
DATED : December 28, 1999
INVENTOR(S) : Andreas Westrich

It is certified that error appears in the above-identified patent and that said Letters Patent is hereby corrected as shown below:

Column 4, Line 56, Claim 10: delete "claim 5" and insert --claim 6--.

Signed and Sealed this

Eighth Day of August, 2000

Attest:

Q. TODD DICKINSON

Attesting Officer          Director of Patents and Trademarks